May 25, 1971  W. SCHMIDT ET AL  3,579,722

APPARATUS FOR CONTINUOUS PRODUCTION OF FOAM PLASTIC SECTIONS

Filed May 22, 1968  2 Sheets-Sheet 1

INVENTOR.
WOLFGANG SCHMIDT, KARL-JOSEF KRAFT, WILLI KURTH.

BY
ATTORNEY

May 25, 1971　　　W. SCHMIDT ET AL　　　3,579,722
APPARATUS FOR CONTINUOUS PRODUCTION OF FOAM PLASTIC SECTIONS
Filed May 22, 1968　　　　　　　　　　　　2 Sheets-Sheet 2

WOLFGANG SCHMIDT, KARL-JOSEF KRAFT, WILLI KURTH.　　INVENTOR.

ATTORNEY 3,579,722
APPARATUS FOR CONTINUOUS PRODUCTION OF FOAM PLASTIC SECTIONS
Wolfgang Schmidt, Cologne, Flittard, Karl-Josef Kraft, Leverkusen, and Willi Kurth, Troisdorf, Germany, assignors to Farbenfabriken Bayer Aktiengesellschaft, Leverkusen, Germany
Filed May 22, 1968, Ser. No. 731,080
Claims priority, application Germany, June 1, 1967, F 52,569
Int. Cl. B29d 27/04
U.S. Cl. 18—4
5 Claims

ABSTRACT OF THE DISCLOSURE

The continous production of foam plastic sections is accomplished in an apparatus comprising a double conveyor belt assembly confined at the sides by lateral side boundary members wherein the inlet aperture between the upper and lower conveyor belts and the lateral side boundaries is closed by a sealing member which has at least one supply nozzle positioned therein.

---

Figure 1:
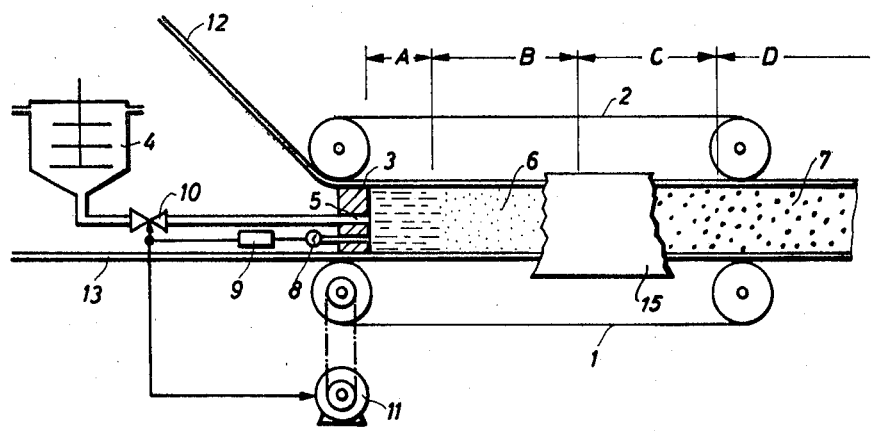

This invention relates generally to an apparatus for the continuous production of foam plastic sections. More particularly, it relates to an apparatus for the continuous production of polyurethane foam plastic sections.

It has been proposed heretofore to apply foam-forming reaction mixtures to a film support by means of a spray attachment reciprocating above the supporting film. In a process employing the heretofore known apparatus a reaction mixture, which can be foamed is first produced from several reactive components and is supplied through the reciprocating applicator nozzle in lines to a carrier foil which, together with a covering foil is run through a cavity between an upper and lower conveyor belt. At the edge of a predetermined width of the supporting film, the reciprocating spraying attachment changes direction. Due to the sudden braking, reversal of direction and return, much larger quantities of the foam-forming reaction mixture are applied along the edges of the film, that is, in the marginal zones of the foam section, than at its center where the reciprocating spray attachment provides a substantially uniform coating. The thus applied foam-forming mixture foams vertically and rises to varying extents depending on the thickness of the film of foam-forming reaction mixture applied. Unfortunately, differences in film thickness are a natural result of the differences in the extent to which the foam-forming reactants expand. Since the foaming reaction sets up immediately, the thickness of the layer cannot be evened out by flow. As the supporting film advances through a conveyor belt, the layer of foam is pressed to eliminate irregularities in foam height. The foam plastic section is only under pressure in the space between the belts by virtue of the presence of the upper conveyor belt and this space is reduced during the final phases of foaming. This, however, gives rise to irregularities in the compactness in the foam layer over its cross-section with the result that the marginal zones in particular often show a much smaller cell structure in cross-section as well as forming heterogeneous zones of different thicknesses in the foam profile which zones adversely affect the mechanical properties of the profile. Thus, the density of the foam is uneven over the cross-section. If the foam is cut transversely, this lack of uniformity in the foam structure can be clearly seen. This renders the work of the construction engineer imprecise and the differences must be compensated for by corresponding over-dimensioning. Unfortunately, the use to which foams with such non-uniform cell structure may be put are severely limited. Accordingly, the marginal zones have to be cut off thereby producing a substantial amount of poor quality product.

It is, therefore, an object of this invention to provide an improved apparatus for the application of continuous foam-forming reaction mixtures to moving supports which are devoid of the foregoing disadvantages and problems. Another object of this invention is to provide an apparatus for applying foam-forming reaction mixtures which results in a product of uniform width and height and which has, along a transverse cross-section, a substantially uniform cell structure. An additional object of the present invention is to provide an apparatus for the production of continuous foam sections devoid of structural defects. A further object of this invention is to provide a foam whose uniformity of density along a transverse cross-section is substantially improved. A still further object of this invention is to provide an apparatus for the production of a profiled continuous foam section which has a homogeneous transverse cross-section but at the same time has properties that are not homogeneous over its entire length.

Still further objects will become apparent from the following description with respect to the accompanying drawings which illustrate the apparatus for carrying the process of the invention into effect.

Figure 2:
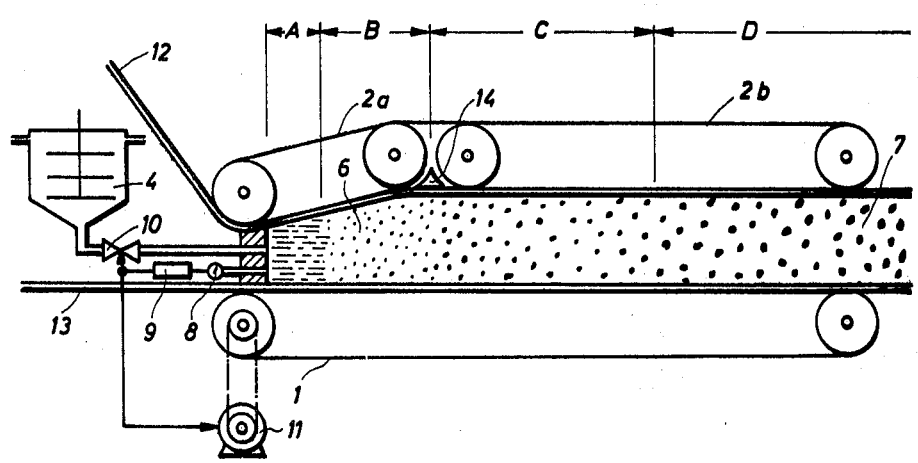

In the drawings:

FIG. 1 shows a sectional elevation of an embodiment of the apparatus of the invention and FIG. 2 shows a sectional elevation of a preferred embodiment of the invention showing an adjustable upper conveyor belt.

In accordance with this invention, generally speaking, the foregoing objects and others are accomplished by applying a foam-forming reaction mixture to a moving film support by an apparatus comprising a double conveyor belt which is confined at the sides by lateral boundary members wherein the inlet aperture between the lower and upper conveyor belts and the lateral side boundaries is closed by a sealing member which has at least one supply nozzle for supplying the foam-forming reaction mixture into a closed foaming space. More particularly, this invention relates to an apparatus for applying a foam-forming reaction mixture such as, for example, a polyurethane foam-forming mixture, to a moving film support comprising a double conveyor belt with lateral side boundaries and a mixing apparatus with an applicator supply nozzle wherein the inlet aperture between the upper and lower conveyor belts and the lateral side boundaries is closed by a sealing member which has at least one foam-forming reaction mixture supply nozzle extending into a closed foaming space. Additionally, this invention contemplates a process for applying a foam-forming reaction mixture to a moving film support wherein the hereinabove and hereinafter described apparatus is employed and wherein the closed foaming space is constantly kept filled with foam-forming reaction mixture which is under a minimum pressure of about 0.05 kg./cm.$^2$.

According to a particularly preferred embodiment of the invention, at least one of the two conveyor belts, preferably the upper conveyor belt, can be adjusted so that it is not linear with the other conveyor belt and the foaming space thus becomes wedge shaped. Alternatively, it is only the actual foaming zone that need expand in the form of a wedge and, thus, the two conveyor belts can be kept substantially parallel in the foam hardening zone. This can be advantageously achieved according to the present invention by making the upper conveyor belt form two individual belts or belt sections which correspond to the lengths of the two zones with a joint between the two belts being bridged over by a suitable sliding guide. In any case, of course, a space between the entire upper conveyor belt and the lower conveyor belt may be varied to any suitable and desired spacing.

In the process employed when operating the apparatus of this invention, a foam-forming reaction mixture is first produced from several reactive components and is then applied through an applicator nozzle to a carrier foil which together with a covering foil is run through a cavity between the upper and lower conveyor belts. The closed foaming space is constantly kept filled with foam-forming reaction mixture which is under a minimum pressure of at least about 0.05 kg./cm.$^2$. If the reaction mixture is continuously supplied at the same rate and the rate of withdrawal of the finished foam section is made dependent upon the speed of the foaming process, the foaming space can always be kept filled. A uniform counterpressure is therefore exerted on all sides of the cross-section of the foam profile during the foaming process by virtue of the initial pressure so that the transverse cross-section of the foam profile produced is homogeneous because the foaming process is at substantially the same stage at substantially every point of the transverse cross-section. The pressure at which the reaction mixture is introduced must, of course, be above the pressure level in the foaming space. Transverse distribution of the mixture may thus be affected by any suitable compensating processes during the low viscosity state of the foam-forming reaction mixture before the main cross-linking has occurred. From a practical aspect, the distribution can be advantageously obtained by a suitable arrangement of several supply nozzles and by their placement in the sealing member with respect to the profile of the foam section to be produced. That is, the enclosed end section may have one or more supply nozzles positioned therein. It is readily seen that the mixture applicator device of this invention does not consist of any moving parts and it is therefore much simpler to manufacture and maintain. Also, the foam plastic sections produced may have any cross-sectional form capable of being produced by a conveyor belt.

Referring now to the drawings for a more detailed description of the apparatus of the invention, FIG. 1 shows a typical embodiment of the invention. The apparatus comprises a double conveyor belt consisting of a lower conveyor belt 1 and an upper conveyor belt 2 confined at the sides by lateral boundary members 15, and any suitable sealing member 3 for the inlet aperture between the conveyor belts 1 and 2 and the lateral side boundaries. The foam-forming reaction components are mixed in any suitable mixing vessel 4 and introduced into a foaming space 6 by any suitable applicator nozzle 5 such as, for example, a polyurethane foam spray nozzle, extending into the foaming space 6. The foaming space 6 is enclosed by the conveyor belts 1 and 2, the sealing member 3, the lateral side boundaries and a finished section of foam plastic 7. The pressure in the enclosed space may be measured with any suitable monitoring device 8 such as, for example, a monometer, and the quantity of foam-forming reaction mixture introduced can be automatically adjusted and regulated by any suitable measuring or proportioning device 9 such as, for example, a measuring valve converter, by adjusting a control means 10 such as, for example, a tap, or by controlling the rate of withdrawal of the finished foam plastic section 7 by adjustment of a suitable drive means 11 for the conveyor belts 1 and 2 whereby the pressure in the foaming space 6 can be suitably adjusted. Covering foil 12 and carrier foil 13 protect the machine parts against dirt, grime and the like. In the zone designated A the foam-forming reaction mixture is still in a liquid state of low viscosity. The foaming process actually occurs in the zone designated B while hardening or setting takes place in the adjacent zone designated C in which zone the foam section 7 takes its final form. The finished section appears in the zone designated as D.

FIG. 2 illustrates a preferred embodiment of the apparatus described in FIG. 1 in that the upper conveyor belt 2 is subdivided into belts 2a and 2b. Belt 2a is situated at the entry of the foaming section and extends over the zones A and B. The angle of belt 2a is obliquely adjustable with respect to the lower belt. Belt 2b is situated at the discharge end of the double conveyor belt assembly and covers the hardening zone C and finished section zone D and is positioned substantially parallel to the lower conveyor belt. A sliding guide means 14 such as, for example, a wedge, bridges the joint between the belts 2a and 2b.

The process of this invention is carried out by forming a foam-forming reaction mixture from several reactive components in a suitable mixer 4 and feeding the mixture through one or more applicator nozzles 5 to a closed foaming section 6 formed by conveyor belts 1 and 2, lateral side boundaries and a finished section of foam plastic 7. The closed foaming space 6 is constantly kept filled with the foam-forming reaction mixture under a minimum pressure of 0.05 kg./cm.$^2$. The foam-forming reaction mixture may be constantly supplied at the same rate and the rate of withdrawal of the finished foam section 7 is then made dependent upon the speed of the foaming process and in this way the closed foaming space 6 can always be kept filled. The pressure at which the reaction mixture is introduced must, of course, be above the pressure level in the foaming section 6. According to this invention the foam pressure is adjusted and regulated by the quantity of foam-forming reaction mixture introduced per unit and/or the rate of withdrawal of the finished foam section 7. Thus, it is possible for the first time by use of the apparatus hereinabove described, by appropriately varying the foaming pressure according to the process associated therewith, to produce a profiled continuous foam section which has a homogeneous transverse cross-section and has, at the same time, properties that are not homogeneous over its entire length. Also, the sections may have any cross-sectional form capable of being produced by means of a conveyor belt. The lateral side boundaries of the sections may be of any form known for conveyor belts and may be varied during the process.

Another advantage of this invention lies in the greater manufacturing speed which depends only on the duration of the foam process and can be correspondingly increased by increasing the length of the conveyor belt.

It is to be understood that the apparatus of this invention may be used for mixing measured quantities of any foam-forming components, however, the apparatus and process are particularly suitable for use in the production of foam products based on the polyaddition, polycondensation or polymerization reactions. The apparatus of this invention finds particular use in the preparation of polyurethane foams. It is possible to combine the reaction components with liquid protective agents such as flame proofing agents, termite protective agents and the like. Also, it is possible in the production of foamed material to use low boiling liquids such as halogenated hydrocarbons and gaseous components.

The polyurethane foams referred to herein can, of course, be prepared by reacting organic compounds containing active hydrogen containing groups with an organic polyisocyanate. Any suitable organic compound containing active hydrogen containing groups such as, for example, hydroxyl polyesters, polyhydric polyalkylene ethers, polyhydric polythioethers, polyester amides, polyacetals, and the like, may be used.

Any suitable hydroxy polyesters may be used in the preparation of polyurethane plastics such as the reaction product of a polycarboxylic acid and a polyhydric alcohol. Any suitable polycarboxylic acid may be used such as, for example, succinic, oxalic, adipic, methyl adipic, sebacic, glutaric, pimelic, azelaic, suberic, phthalic, terephthalic, isophthalic, 1,2,4-benzene tricarboxylic, thiodiglycollic, thiodipropionic, maleic, fumaric, itaconic, citraconic or mixtures thereof. Any suitable polyhydric alcohol may be used such as, for example, ethylene glycol, propylene glycol, butylene glycol, amylene glycol, 1,6-hexanediol, trimethylol propane, pentaerythritol and the like.

Any suitable polyester amide may be used in the preparation of polyurethane plastics such as, for example, the reaction product of an amine or amino alcohol with a polycarboxylic acid. Any suitable amine such as ethylene diamine and propylene diamine and the like may be used. Any suitable amino alchol such as, for example, b-hydroxy ethyl amine and the like may be used. Any suitable polycarboxylic acid such as those disclosed above with relation to the preparation of hydroxyl polyesters may be used.

Any suitable polyhydric polyalkylene ether may be used in the preparation of a polyurethane plastic such as, for example, the condensation product of alkylene oxides with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may be used such as, for example, ethylene oxide, propylene oxide, butylene oxide, amylene oxide or mixtures thereof. The polyhydric polyalkylene ethers may be prepared by any known process such as the process described by Wurtz in 1859 in the "Encyclopedia of Chemical Technology," volume 7, pages 257 to 262, published by Interscience Publishers, Inc. (1951), or in U.S. Pat. 1,922,459.

Any suitable polyhydric polythioether may be used in the preparation of polyurethane plastics such as, for example, the reaction product of one of the aforementioned alkylene oxides used in the preparation of the polyhydric polyalkylene ethers with a polyhydric thioether such as, for example, thiodiglycol, 3,3' - dihydroxypropylene sulfide, 4,4'-dihydroxybutylene sulfide, 1,4-(b-hydroxyethyl) phenol dithioether and the like.

Any suitable polyacetal may be used in the preparation of polyurethane palstics such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above in the preparation of polyesters may be used.

Any suitable organic polyisocyanate or polyisothiocyanate may be used in the preparation of polyurethane plastics such as, for example, those disclosed in U.S. Reissue Pat. 24,514. Also any of the following organic polyisocyanates and polyisothiocyanates may be used such as, for example, hexamethylene diisocyanate, 2,4-tolylene diisocyanate, 4,4'-diphenyl methane diisocyanate, 4,4'-diphenyl dimethyl methane diisocyanate, 4,4',4"-triphenyl triisocyanate, 2,4,6-triisocyanato-s-triazine, xylylene diisocyanates, 2,6-tolylene diisocyanate, 1,5-naphthylene diisocyanate, 1 - methyl - 2,4-diisocyanato-5-chlorobenzene, 1-methyl-2,4 - diisocyanato-cyclohexane, 1-methyl-2,4-diisocyanato-5 - nitrobenzene, m-phenylene diisocyanate, p-phenylene diisocyanate, 1,4-naphthylene diisocyanate, the corresponding polyisothiocyanates and the like.

Of course, polyurethane foams have found widespread utility in the form of cellular products. Cellular products have found widespread use in the furniture industry and also in the automotive industry.

Although certain representative embodiments and details have been shown for the purpose of illustrating this invention, it will be apparent to those skilled in the art that various changes and modifications may be made therein without departing from the spirit and scope of the invention except as is set forth in the claims.

What is claimed is:

1. Apparatus for continuous production of foam plastic sections comprising a substantially horizontal double conveyor belt consisting of an upper conveyor belt and a lower conveyor belt, lateral boundry members confining the side space between said conveyor belts, an inlet aperture, formed by said lower and upper conveyor belts and said lateral side boundary members which has a sealing member therein and at least one foam-forming reaction mixture supply nozzle extending through said sealing member into a sealed foaming space defined by said sealing member, said upper and lower conveyor belts and said lateral boundry members, and means for feeding foam-forming material to said nozzle.

2. The apparatus of claim 1 wherein a mixing vessel is connected to the supply nozzle.

3. The apparatus of claim 1 wherein the upper conveyor belt is obliquely adjustable in relation to the lower conveyor belt.

4. The apparatus of claim 1 wherein the upper conveyor belt is composed of two belt sections comprising a first belt section situated at the entry of the sealed foaming space and being obliquely adjustable in relation to the lower conveyor belt and a second belt section situated at the discharge end of the double conveyor belt assembly and being substantially parallel to the lower conveyor belt.

5. The apparatus of claim 4 having a pressure control means for controlling the pressure in the sealed foaming space.

References Cited

UNITED STATES PATENTS

| 3,269,882 | 8/1966 | Willy | 18—4BX |
| 3,284,850 | 11/1966 | Verly | 18—4BX |
| 3,383,441 | 5/1968 | Norrhede et al. | 18—4BX |
| 3,422,178 | 1/1969 | Junker et al. | 18—4BX |

H. A. KILBY, JR., Primary Examiner